United States Patent [19]

Chiang et al.

[11] Patent Number: 5,460,048
[45] Date of Patent: Oct. 24, 1995

[54] ULTRASONIC SENSOR USING A POLARIZATION MAINTAINING FIBRE

[76] Inventors: Kin S. Chiang, 1/200 Pacific Highway, Greenwich, New South Wales, Australia, 2065; Helen L. W. Chan, 21A Hannah St., Beecroft, New South Wales, Australia, 2119

[21] Appl. No.: 910,124
[22] PCT Filed: Jan. 17, 1991
[86] PCT No.: PCT/AU91/00023
§ 371 Date: Aug. 18, 1992
§ 102(e) Date: Aug. 18, 1992
[87] PCT Pub. No.: WO91/10885
PCT Pub. Date: Jul. 25, 1991

[30] Foreign Application Priority Data

Jan. 19, 1990 [AU] Australia ................... PJ 8301

[51] Int. Cl.$^6$ .............. H01J 5/16; G01N 21/00
[52] U.S. Cl. .............. 73/657; 250/227.17; 385/13
[58] Field of Search .............. 73/657, 655; 250/227.17; 385/1, 12, 13; 356/345, 349

[56] References Cited

U.S. PATENT DOCUMENTS

| 4,442,350 | 4/1984 | Rashleigh | 73/657 |
| 4,659,923 | 4/1987 | Hicks, Jr. | 250/227.17 |
| 5,297,436 | 3/1994 | Chan et al. | 73/657 |

FOREIGN PATENT DOCUMENTS

| 39790 | 2/1990 | Australia . |
| 0291404 | 11/1988 | European Pat. Off. . |
| 2311643 | 9/1974 | Germany . |
| 59-40218 | 3/1984 | Japan . |
| 63-195529 | 8/1988 | Japan . |

OTHER PUBLICATIONS

"Single–Mode Fiber Ultrasonic Sensor" by De Paula et al., IEEE Journal of Quantum Electronics, Apr. 1982 pp. 680–683.

"Acousto–Optic Interaction in a Highly Birefrigernt Optical Fiber" by Kin S. Chiang, The Electrochemical Society 178th Meeting, Abstract No. 768, pp. 1094–1095 (Oct. 1990).

"High-Frequency Ultrasonic Sensor Using a Highly Birefringement Optical Fibre" by K. S. Chiang, 7th Optical Fiber Sensor Conference, Sydney, Australia (Dec. 1990).

"Optical Fibre Ultrasonic Sensors" by K. S. Chiang, A.O.S. News vol. 6, No. 1, pp. 10–13 (Mar. 1992).

IEEE 1988 Ultrasonics Symposium, Proceedings, vol. 1, pp. 600, 602, B. R. McAvoy, Editor, Oct. 2–5, 1988.

Patent Abstracts of Japan, vol. 12, No. 477 (P–800) {3324}, Appln. No. 62–26880, Feb. 7, 1987, "Optical Fiber Hydrophone".

"The Penguin Dictionary of Electronics"; 2nd Edition; 1988; pp. 98–100.

IEEE 1988 Ultrasonics Symposium, Oct. 2, 1988, Chan et al., "Polarimetrical Optical Fiber Sensor for Ultrasonic Power Measurement", pp. 599–602.

*Primary Examiner*—Hezron E. Williams
*Assistant Examiner*—Rose M. Finley
*Attorney, Agent, or Firm*—Leydig, Voit & Mayer

[57] ABSTRACT

An ultrasonic sensor having a polarization maintaining fibre including two orthogonal linear principal axes and a straight sensing portion. A laser source directs a beam through a quarter wave plate to provide a circularly polarized beam to an input end of the fibre. The beam emerging from an output end of the fibre is directed to a linear polarizer and the intensity of the beam is detected by a photodetector. A signal processor thereafter generates suitable driving signals for a display unit indicative of mode coupling induced in the fibre by incident ultrasonic waves.

11 Claims, 2 Drawing Sheets

ULTRASONIC SENSOR USING A POLARIZATION MAINTAINING FIBRE

TECHNICAL FIELD

Ultrasonic sensors have application in the characterisation of high frequency ultrasonic transducers and transducer arrays. This characterisation takes the form of output power measurements and beam profile measurements which determine the spatial distribution of output power and radiation pattern measurement which determine the angular distribution of output power. Such measurements also allow the calculation of other required parameters of ultrasonic devices. These measurements are particularly important in relation to ultrasonic devices for medical applications since the total output power and beam profiles must be accurately measured to ensure the safety of patients.

BACKGROUND ART

Hitherto the sensing of ultrasound has commonly been based on the use of a piezoelectric active element, such as a polyvinylidene-fluoride film. When the ultrasonic power is very high, this material can lose sensitivity or even become damaged. Additionally, the currently available size of these active elements is too large to resolve very narrow ultrasonic beams generated by highly focusing transducers. For these reasons, conventional hydrophones are not very satisfactory for characterising medical ultrasound that is of high power and highly focused.

A fibre optic ultrasonic sensor based on the use of a single-mode optic fibre has been proposed to alleviate some of these disadvantages. These devices operate on the principle that when an ultrasonic wave in the megahertz range is incident normally upon a single-mode fibre, the fibre becomes anisotropic, and consequently, the polarisation of the light at the output end of the fibre is modulated by the ultrasonic pressure along the fibre and thus varies at the ultrasonic frequency. The difficulty with sensors based on a single-mode fibre is that means must be provided to ensure that the light entering the region of interaction is circularly polarised, and that the optimum bias phase is also maintained at the same time. In practice this requires massive feedback control on optical components at both the input and output ends of the fibre to avoid signal fading due to environment disturbances to the fibre. This requirement has limited the application of ultrasonic sensors based on a single mode fibre.

Furthermore, the prior art does not provide an effective method for measuring the radiation pattern (or directivity) of the ultrasonic wave.

DISCLOSURE OF THE INVENTION

It is an object of this invention to provide an ultrasonic sensor which will overcome, or at least ameliorate, one or more of the abovementioned disadvantages.

Accordingly, an ultrasonic sensor according to the invention includes a polarisation maintaining fibre having two orthogonal principal axes, an input end and an output end, input means to launch into said fibre a light beam aligned with at least one of said principal axes, and output means to determine a degree of mode coupling induced in said fibre by incident ultrasonic waves.

The polarisation maintaining fibre is an anisotropic, or birefringent, medium including two orthogonal or mutually perpendicular principal axes. The light beams may be linearly polarised along these two axes and may encounter slightly different refractive indices Accordingly, the light beams may propagate at slightly different velocities. Since these two linear polarisations of light do not easily couple to each other, the fibre is said to maintain these two polarisations. The two light waves are termed the polarised modes of the fibre. A single-mode fibre does not possess this property since there is no preferred axis associated with the fibre. The polarisation maintaining fibre used in this invention can be of any known type as long as it maintains linear polarisations. Examples of suitable known polarisation maintaining fibres are the "bow-tie" fibre, PANDA fibre and elliptically clad fibre. The section of the fibre exposed to the ultrasonic field can be jacket-free or coated with any kind of material, depending on specific applications. The overall fibre diameter is preferably made as small as possible to achieve maximum spatial resolution for ultrasonic beam profile measurement.

This invention relies on the principle that, when acting upon a polarisation-maintaining fibre, an ultrasonic wave can induce mode coupling in the fibre. Optical power can be transferred from one polarised mode to the other in the presence of an ultrasonic wave when the principal axes of the fibre are not aligned with the propagation direction of the ultrasonic wave. Maximum power transfer occurs when the principal axes of the fibre are at 45 degrees to the propagation direction of the ultrasonic wave. With such a fibre orientation, ultrasonically induced birefringence is negligible. The ultrasonic wave is allowed to be incident obliquely upon the fibre. The optical frequency of the coupled polarised mode is shifted by an amount equal to the ultrasonic frequency when the incident angle of the ultrasonic wave, $\phi$, satisfies the following condition: [W. P. Risk, G. S. Kino, H. J. Shaw, and R. C. Youngquist, in Proc. IEEE Ultrasonics Symposium (Institute of Electrical and Electronics Engineers, New York), pp. 318–327, 1984]

$$\phi = \sin^{-1} \frac{v_a}{L_b f_a} \quad (1)$$

where $L_b$, the beat length of the fibre, is inversely proportional to the birefringence of the fibre, and is a characteristic parameter of the polarisation-maintaining fibre, $v_a$ is the acoustic velocity of the ultrasonic wave in the medium surrounding the fibre, and $f_a$ is the ultrasonic frequency. The equation indicates the phase-matching condition that travelling strains with a period equal to the beat length of the fibre are set up along the fibre by the ultrasonic wave. This invention makes use of this frequency-shifting phenomenon to measure the amount of optical power transfer, which is related to the ultrasonic pressure.

In one embodiment a single beam aligned with one of the principal axes is launched and the degree of mode coupling determined from heterodyne interference between two beams respectively aligned with one of the principal axes emerging from the output end.

In another embodiment light beams respectively aligned with each of the principal axes are launched and the degree of mode coupling determined from the heterodyne interference in either one of the beams respectively aligned with the principal axes emerging from the output end.

Where a single beam aligned with one of the principal axes is launched the output beam is preferably passed through a linear polariser with its principal axis rotationally displaced with respect to the principal axes of the fibre. The beam passing through the linear polariser contains a signal at the ultrasonic frequency which is the result of heterodyne interference between the initially launched beam and a frequency shifted beam propagating in alignment with the other principal axis of the fibre due to mode coupling.

Where light beams respectively aligned with each of the principal axes of the fibre are launched the output beam is preferably passed through a linear polariser with its principal axis substantially parallel to either of the principal axes of the fibre. The beam passing through the polariser contains a signal at the ultrasonic frequency which is the result of heterodyne interference between the initially launched beam and a frequency shifted beam coupled from the other beam propagating in the fibre.

A significant advantage of the ultrasonic sensor according to this invention is that the amplitude of the signal resulting from heterodyne interference is insensitive to environmental disturbances to the fibre. Consequently, compensation against signal fading is not required.

Additionally, by varying the angle of the fibre to the incident ultrasonic wave the sensor according to this invention allows separation of the ultrasonic harmonies and the measurement of the directivity. Additionally, since the optical fibre sensor has a small dimension, the fibre does not significantly perturb the ultrasonic field being measured Additionaly, because the spatial resolution of the sensor depends on overall fibre diameter, significantly better resolution is possible as compared with prior art hydrophones.

It will also be apparent that because the sensor of this invention is based on detection of light signals instead of electrical signals as in conventional hydrophones, it can tolerate very large electromagnetic interference. This is particularly important in high power high frequency ultrasonic detection.

Finally, because of its relative compactness and the geometric flexibility of the sensor, this invention provides a basis for a portable ultrasonic detector for field applications.

BRIEF DESCRIPTION OF THE DRAWINGS

Some embodiments of this invention will now be described, by way of example only, with reference to the accompanying drawings in which.

MODES FOR CARRYING OUT THE INVENTION

Figure 1:
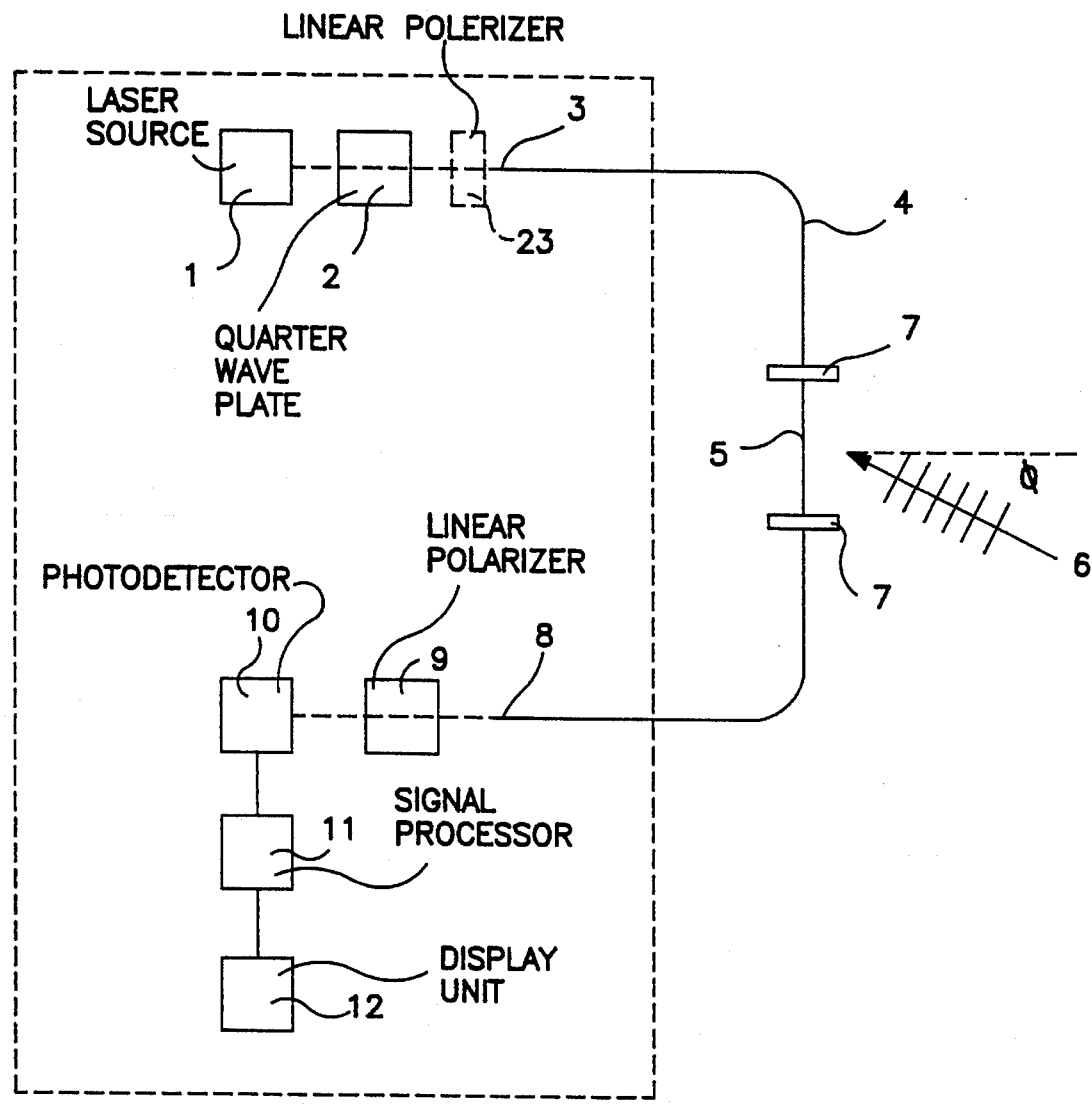
FIG. 1 is a schematic block diagram of an ultrasonic sensor according to one embodiment of this invention.

As shown in FIG. 1 the ultrasonic sensor of one embodiment comprises a laser source 1 and a quarter wave plate 2 through which the output from the laser is directed to provide a circularly polarised beam. The laser source can be a gas laser or a laser diode providing a linearly polarised output. The output from quarter wave plate 2 is directed to an input end 3 of a polarisation maintaining fibre 4 of substantially known type. Fibre 4 includes a substantially straight sensing portion 5 which is exposed to the incident ultrasonic wave to be measured schematically shown at 6. Sensing portion 5 is mounted by suitable known means illustrated at 7 so that the fibre is at 45° to the propagation direction of the ultrasonic wave. Maximum mode coupling is achieved when the ultrasonic incident angle $\phi$ satisfies equation 1. Preferably the sensing portion 5 is sufficiently long to intercept an entire ultrasonic beam.

Light from an output end 8 of fibre 4 is directed to a linear polariser 9 with its principal axis aligned with one of the principal axes of the fibre and the intensity of the transmitted beam is detected by photodetector 10. Photodetector 10 can be of any suitable type, for example a PIN photodiode or an avalanche photodiode, followed by an electronic amplifier or a photomultiplier.

The output signal from photodetector 10 is directed to a signal processor 11 which in turn generates a suitable driving signal for a display unit 12. The display unit can, for example, be an oscilloscope, spectrum analyser, a computer or a simple meter.

The operation of the ultrasonic sensor is as follows. A linearly polarised output beam from laser 1 is directed through quarter wave plate 2 to produce a circularly polarised beam which is directed to input end 3 of fibre 4. In this way light beams respectively aligned with each of the principal axes of fibre 4 are launched into the fibre. As the beams pass through sensing portion 5 the incident ultrasonic wave causes some optical power from one polarised mode to be transferred into the other polarised mode with a shift of the optical frequency by an amount equal to the acoustic frequency. The time varying or a.c. component of the intensity signal at the ultrasonic frequency generated by photodetector 10 is the result of heterodyne interference of the beam launched into the axis aligned with the linear polariser and a beam coupled from the other beam launched into the fibre. The d.c. component depends only on light intensity. The output beam passes through linear polariser 9 and the beam from the aligned principal axis is directed to photodetector 10.

Thus, the ratio of the a.c. component of the intensity signal generated by photodetector 10 to the constant level or d.c. component of the same signal provides a measure of the ultrasonic pressure along the fibre which is independent of light intensity fluctuations. This ratio is calculated by the processor 11 and a driving signal is generated for display 12 to display the measurement in a suitable known manner.

In an alternate embodiment (illustrated by dotted lines) a single beam aligned with one of the polarisation axes of fibre 4 is launched. This can be achieved by placing a linear polariser 23 between the quarter-wave plate 2 and input end 3 of fibre 4. The polarisation axis of the polariser is aligned with one or other of the polarisation axes of the fibre 4. At the output end linear polariser 9 is arranged such that the polarisation axis is rotationally displaced by 45° with respect to the principal axes of fibre 4. In this arrangement mode coupling induced by the incident ultrasonic wave 6 gives rise to the propagation of a frequency displaced beam in alignment with the other principal axis of the fibre. Because the linear polariser 9 is rotationally displaced with respect to the principal axes of fibre 4 the output of the polariser comprises an addition of components of the light beams respectively aligned with each of the principal axes. That is, the components interfere. Consequently, the a.c. component of the signal from the photodetector 10 at the ultrasonic frequency is again the result of interference between a launched and coupled mode. The operation of the ultrasonic detector of this alternate embodiment is otherwise identical to that described above.

Figure 2:
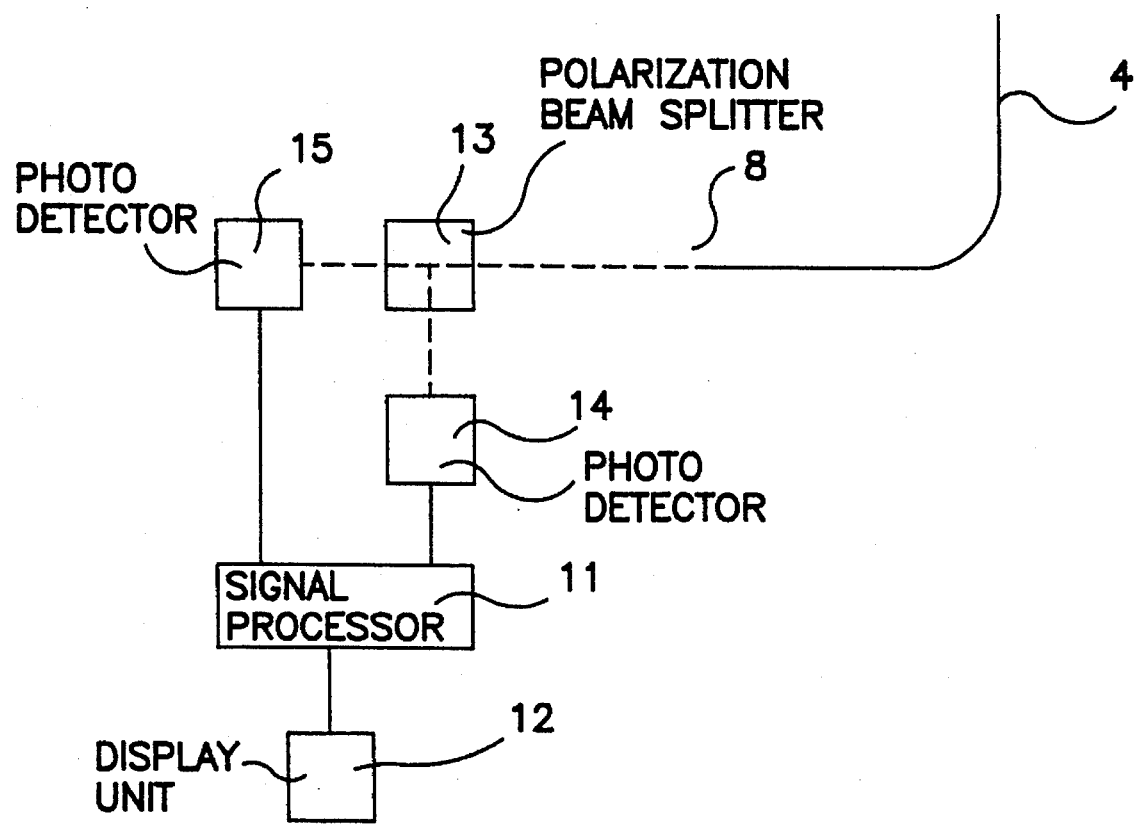
FIG. 2 is a schematic block diagram of a modification to the arrangement shown in FIG. 1.

FIG. 2 shows a modification to the arrangement shown in FIG. 1. Where applicable the same reference numerals have been used to identify the same components. In accordance with this modification light from output end 8 of fibre 4 is directed to a polarisation beam splitter 13 arranged with its principal axes rotationally displaced by 45° to the principal axes of fibre 4. The two light beams produced are of orthogonal polarisation and each comprise an addition of component light beams respectively aligned with each of the principal axes of the fibre. That is, each separate beam contains a component of each of the beams from the polarisation maintaining fibre so that each provides a measure of the degree of mode coupling between the beams that have propagated through the fibre. The intensity of each beam is detected by photodetectors 14 and 15. The signals from photodetectors 14 and 15 are processed independently as described above in relation to the signal from photodetector 10. The processed signals are added constructively by processor 11 after inversion of one of the signals to give a measurement of improved sensitivity. As with the embodiment described above a suitable driving signal for display unit 12 is provided by the signal processor 11.

Both the abovementioned arrangements provide for a general purpose hydrophone for detecting ultrasound in the megahertz range in a liquid medium, or in the sub-megahertz range in a gas medium. To detect an ultrasonic signal at a given frequency, the angle φ is arranged to establish the phase-matching condition. This is achieved by rotating the fibre with respect to the incident signal or alternatively, the sensing portion is formed in a curve. Both alternatives allow the measurement of a large range of signal frequencies over a significant angular range, while the latter is preferable as no physical movement of the sensor is necessary.

Due to the small diameter of the fibre, a sensor according to the invention is able to successfully measure the beam profile of an ultrasonic signal with high resolution. That is, the spatial distribution of the ultrasonic pressure. When used for this application, the sensing portion is laterally scanned across the ultrasonic beam and the resulting output signal suitably processed, by say, tomographic computation.

To determine the radiation pattern (or the directivity) of an ultrasonic beam, the sensing portion is rotated to vary φ. At each sampled value of φ, a corresponding output value is indicative of an ultrasonic signal satisfying the phase-matching condition.

It will be appreciated that the sensor output as a function of φ gives a one-dimensional radiation pattern. To obtain a two-dimensional pattern, a plurality of laterally spaced one-dimensional measurements are taken.

Furthermore, the acoustic velocity of the medium surrounding the sensing portion is able to be measured should the other variables of Equation (1) be fixed. This allows the sensor to be used in the quality control of certain fluid products whose composition is related to the acoustic velocity.

For example, an unfocused transducer which generates a plane ultrasonic wave along a well defined direction can generally be used. The sensor can then establish the phase-matched condition, from which the acoustic velocity $v_a$ can be calculated from equation (1). The velocity can be calculated by measuring the angle φ which gives a peak signal at a given frequency $f_a$ or alternatively, determining the value of $f_a$ that gives a peak signal at a fixed angle φ. The value of $L_b$ is a characteristic of the fibre and is easily accurately obtained.

In applications where the requirement of the sensor is to provide an indication of the absence or presence of an ultrasonic signal, the thickness of the fibre coating is not critical and subsequent signal processing is very simple.

I claim:

1. An apparatus for use in an ultrasonic sensor comprising:

a polarisation maintaining fibre for being disposed in the path of an ultrasonic wave, the fibre having two orthogonal principal axes, an input end, and an output end;

input means to launch into the input end of the fibre a light beam aligned with at least one of the principal axes; and output means for receiving the light beam from the output end of the fibre and for determining mode coupling induced in the fibre by the ultrasonic wave and thereby provide a first signal indicative of the magnitude of the ultrasonic wave.

2. The apparatus according to claim 1 wherein the output means determines the mode coupling from an ultrasonic frequency signal resulting from heterodyne interference between light beams emerging from the output end of the fibre.

3. The apparatus according to claim 2 wherein a linear polariser is coupled to the output end of the fibre.

4. The apparatus according to claim 3 wherein a principal axis of the linear polariser is substantially parallel to either of the principal axes of the fibre.

5. The apparatus according to claim 4 wherein the input means launches light beams respectively aligned with each principal axis of the fibre.

6. The apparatus according to claim 3 wherein a principal axis of the linear polariser is rotationally displaced with respect to the principal axes of said fibre.

7. The apparatus according to claim 6 wherein the input means launches the light beam in alignment with only one principal axis of the fibre.

8. The apparatus according to claim 1 wherein the input means includes a laser source.

9. The apparatus according to claim 8 including a quarter wave plate through which an output of the laser source is passed for providing a circularly polarised beam.

10. The apparatus according to claim 1 wherein a short length of the fibre is a sensing portion.

11. The apparatus according to claim 3 wherein the linear polariser adds components of light beams respectively aligned with each of the principal axes of the fibre.

* * * * *

UNITED STATES PATENT AND TRADEMARK OFFICE
CERTIFICATE OF CORRECTION

PATENT NO. :    5,460,048
DATED       :    October 24, 1995
INVENTOR(S) :   Chiang et al.

It is certified that error appears in the above-indentified patent and that said Letters Patent is hereby corrected as shown below:

Title Page,
Item [76], delete "Helen L. W. Chan, 21A Hannah St., Beecroft, New South Wales, Australia, 2119".

Signed and Sealed this

Twenty-first Day of May, 1996

Attest:

BRUCE LEHMAN

Attesting Officer        Commissioner of Patents and Trademarks